B. W. GOULD.
Improvement in Grain Drill.
No. 123,394. Patented Feb. 6, 1872.
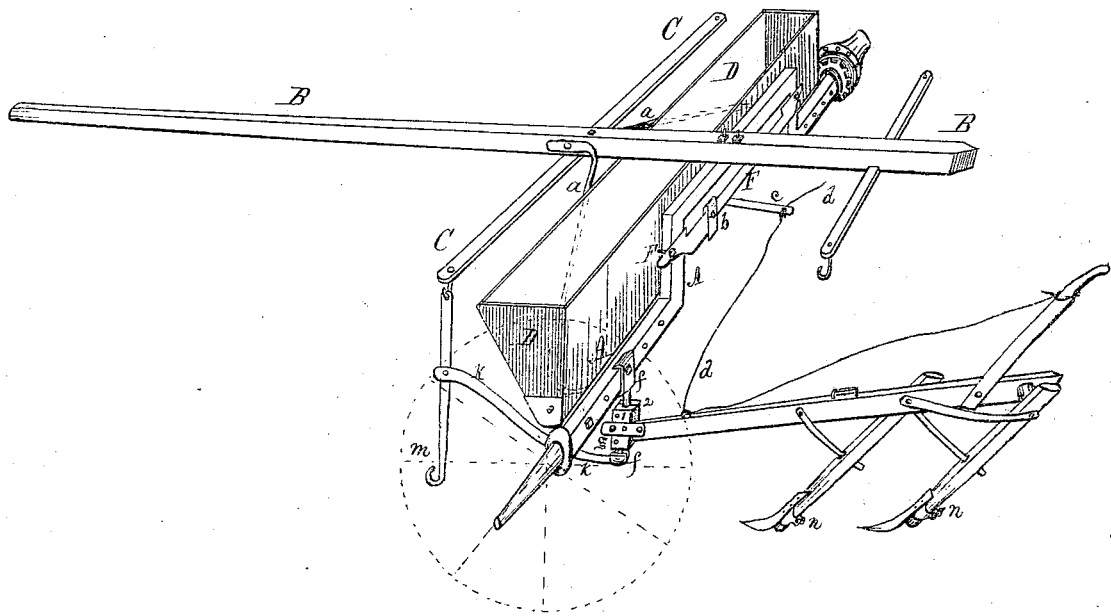
Witnesses.
N. Sipp
M. E. Orwig
Benjamin W. Gould
Inventor,
Thomas G. Orwig
Attorney

123,394

UNITED STATES PATENT OFFICE.

BENJAMIN W. GOULD, OF WINTERSET, IOWA.

IMPROVEMENT IN GRAIN-DRILLS.

Specification forming part of Letters Patent No. 123,394, dated February 6, 1872.

SPECIFICATION.

I, BENJAMIN W. GOULD, of Winterset, in the county of Madison and State of Iowa, have invented certain Improvements in a Combined Seeder and Cultivator, of which the following is a specification:

My invention is an improved agricultural machine, that can be used advantageously as a seeder and also as a cultivator, at the will of the operator. It consists in making the frame of the cultivator in a rack-like form, suitable to hold the seed-box in front and above the axle; in securing the seed-box by means of a graduating plate; in connecting the beam and the evener underneath the axle by means of an adjustable pendant; in attaching a flexible check-rein to open and close the valves in the seed-box—all and every part made, combined, and operated as hereinafter fully set forth.

My drawing is a perspective view of the novel features in my machine, and illustrates the manner of combining and operating the various parts mentioned.

A A is an iron-bowed axle, of common form, and may vary in dimensions and weight. B B is the pole. C C is the evener, pivoted to the pole. $a$ $a$ represent wrought-iron braces running right and left from the pole, and downward and backward to the axle. At their lower ends they have an elbow-form to correspond with the bottom of the seed-box. They are secured by means of bolts. D D is a seed-box, of triangular form, that rests in the rack formed by the axle, the pole, and the braces $a$ $a$. It has a perforated bottom, and a sliding register to open and close the valves, such as are in common use. An agitator in the bottom of the seed-box is journaled in the ends of the box, and is operated by the common means of a gear-wheel attached to the hub of the cultivator-wheel. F F is a plate used for the double purpose of holding the seed-box securely in its rack, and to graduate the quantity of seed passing through the valves of the seed-box. Bolts, passing from the inside of the seed-box, secure the plate, and also the seed-box, firmly to the bow of the axle. The form of this plate may be varied to suit the fancy of the builder.

By taking off the nuts and withdrawing the bolts, the seeder can be readily separated from the cultivator whenever desired.

$b$ represents a slide on the graduating plate, by means of which the space of the openings or valves in the seed-box may be fixed. Figures or characters may be cut or otherwise made on this plate in such a manner as to indicate how much the valves are open or closed. $c$ is a short arm, pivoted underneath and on the front side of the seed-box, and connected with the sliding register in a common way. $d$ $d$ is a flexible check-rein, running from the end of the arm $c$ and through a loop on the front end of the beam to the handle of the cultivator. By pulling alternately upon the right and left ends of this check-rein the valves in the seed-box can be opened and closed. Pulling on the right end will move the arm $c$ to the right and close the register. Pulling the left end will open it. A simple and effective means is thus placed within the grasp of the operator to stop the dropping of seed when he turns around at the ends of the field, and whenever desired. $f$ $f$ is an adjustable pendant that slides upon the axle, and is secured by a bolt. By withdrawing the bolt, the pendant and the beam attached may be moved in or out as the series of holes in the axle indicates.

The pendant may vary in length, and furnishes a means of raising and lowering the front end of the beam, and provides lateral motion for the same; and also brings the draft from the horses below the axle. It provides a way of applying the draft below the axle, and thereby leaving the space above the axle clear for the free operation of the seeder.

1 2 represent a metal boxing in two parts that incloses the round part of the pendant. $g$ is one of the side plates inclosing the boxing 1 2, and also the front end of the beam. These plates are pivoted in front by a bolt passing through the metal boxing and at the rear end by a bolt passing through the beam. The front ends of these plates may be raised and lowered, as indicated by the holes in the metal boxing. $k$ $k$ is a brace pivoted to the lower end of the pendant $f$ $f$, and to the middle of the single-tree hook $m$, suspended from the end of the evener C C.

By the use of the pendants $f$ $f$, combined with axle A A, and the metal boxes 1 2, and the plates *g*, both lateral and vertical adjustment, and also independent lateral and vertical play, is provided for the beams of the cultivators. By combining the braces *k k* with the single-tree hook *m* and the evener C C, the draft from the horses is communicated by a yielding elastic connection, and at a point very close to the ground, and the seeder above the axle is left free to operate at the same time the cultivators are operated. The consequence is a light draft and no rigid strain upon horses or machine.

*Claims.*

I claim as my invention—

1. The bowed axle A A, the pole B B, the evener C C, the braces *a a*, the seed-box D D, the plate F F, the pivoted braces *k k*, and the suspended hooks *m*, combined and operated as described, and for the purposes specified.

2. The flexible check-rein *d d*, combined with the cultivator and the seeder, in the manner described, and for the purposes specified.

Witnesses:    BENJAMIN W. GOULD.
  ED. HYDERS,
  J. W. COCKLIN.